United States Patent Office 2,745,511
Patented May 15, 1956

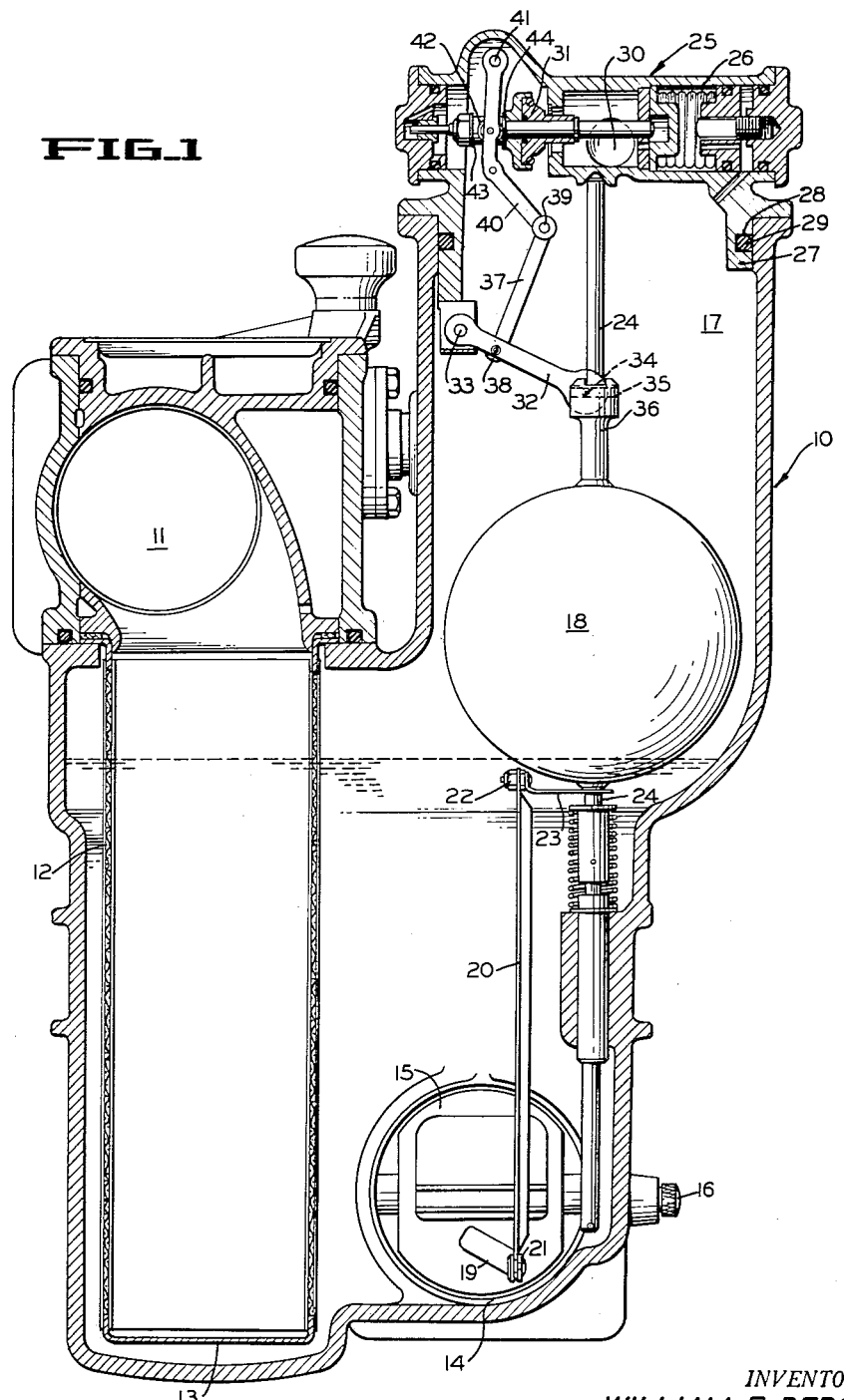

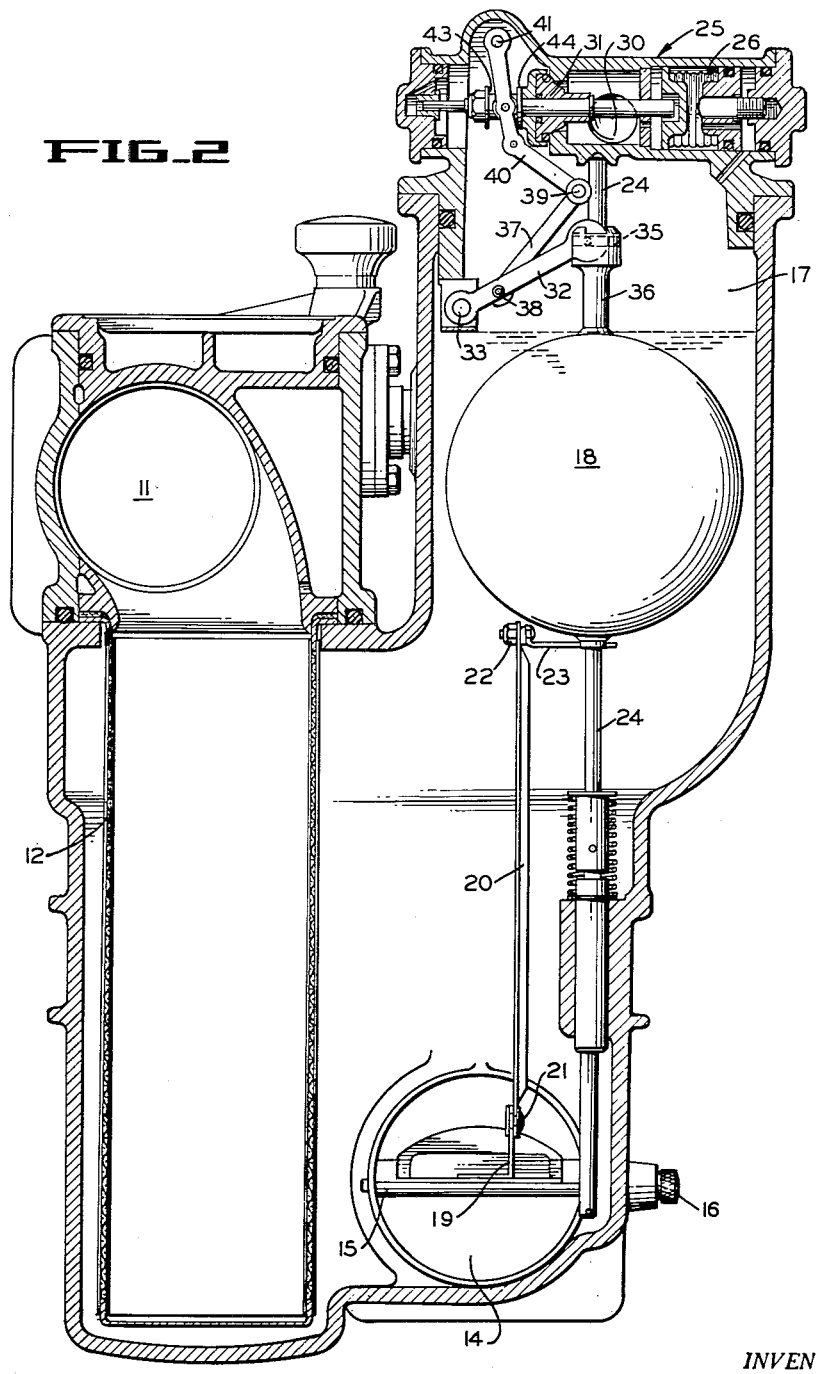

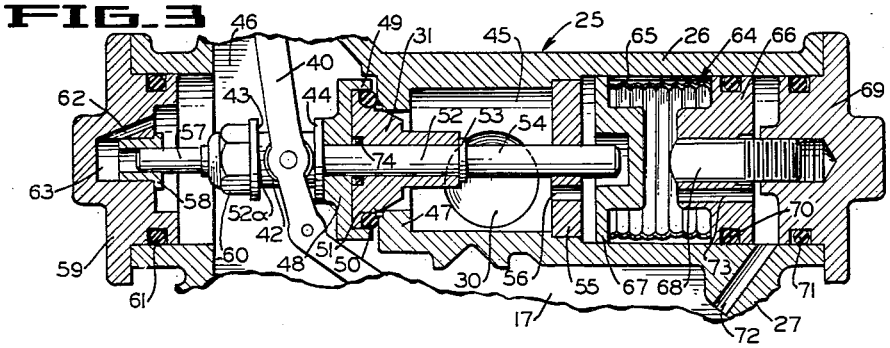
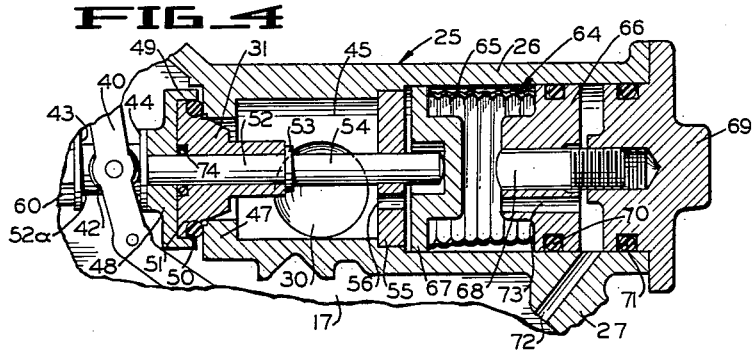
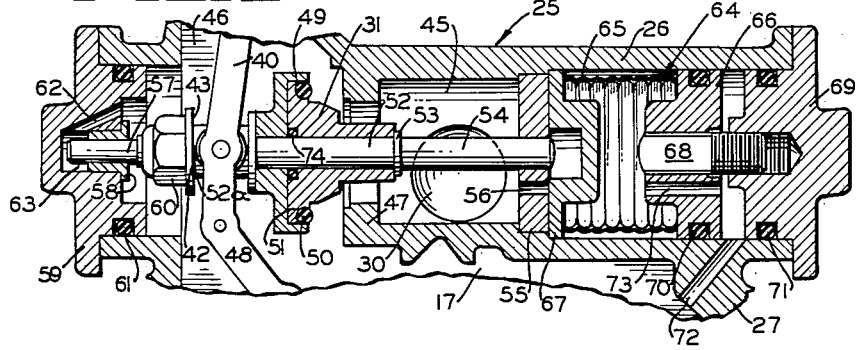

2,745,511

AIR ELIMINATOR VALVE

William F. Berck, Hayward, Calif., assignor to Ralph N. Brodie Company, San Leandro, Calif., a corporation of California Application May 3, 1954, Serial No. 427,051

7 Claims. (Cl. 183—2.5)

This invention relates to an air eliminator assembly and more particularly to a valve assembly for seperating and eliminating entrained air from a liquid.

It is well known that the presence of entrained air and gas in liquid is a problem in many phases of industry. It is particularly a problem when positive displacement meters are used to accurately measure liquid in a flowing line wherein the entrained air or gas must be eliminated in some manner before the liquid enters the meter in order to obtain an accurate measurement.

The principal object of this invention is to provide a novel form of air eliminator valve.

A further object of this invention is to provide an air eliminator valve of the poppet type wherein a bellows under line pressure is in abutting relation with the valve stem to balance the line pressure operating on the head of the valve and statically balance the valve over the full range of possible line pressures.

A preferred form of the instant invention is described in the following description and illustrated by way of example in the accompanying drawings, wherein:

Fig. 1 is a sectional view through an air eliminator assembly embodying the principles of my invention, and showing the air escape valve in its open position.

Fig. 2 is a similar view to that shown in Fig. 1 but showing the air escape valve, and its associated elements, in the closed position.

Fig. 3 is an enlarged sectional view through the air escape valve per se and illustrates the valve and its associated elements in the positions they would occupy when no pressure is in the air eliminator assembly.

Fig. 4 is a similar view to that shown in Fig. 3 and illustrates the positions occupied by the various elements when the air eliminator assembly is under pressure and the air escape valve is closed.

Fig. 5 is a similar view to Figs. 3 and 4 and illustrates the positions of the several elements with their air eliminator under pressure and the air escape valve open.

Referring now to the drawings, wherein similar reference numerals are used to designate similar parts throughout the various views shown, the air eliminator comprises a housing, generally indicated at 10, provided with an inlet opening 11. The inlet 11 opens into a cylindrical screen 12 closed at its lower end by a cap 13. An outlet opening 14 is provided adjacent the lower end of the housing 10. A butterfly valve 15 is located in the outlet 14 and is pivotally mounted on a pivot shaft 16 extending through its mid-portion.

A cylindrical air trap chamber 17 is located in the upper portion of the housing 10 above the outlet 14. A float 18 is located in said air trap chamber 17 for vertical reciprocating movement therein. A bracket 19 is fastened to the butterfly valve 15 and extends outwardly therefrom. A link 20 is attached at one of its ends to the outer end of the bracket 19 by a pivot pin 21. A second pivotal connection 22 connects the other end of the link 20 to a bracket 23 which is fastened to the float 18. The float 18 is guided for vertical movement by a guide bar 24 which extends through a suitable opening provided in said float.

The air escape valve mechanism is generally indicated at 25 and comprises a housing 26 having a depending cylindrical skirt 27 adapted to be slidably inserted in the upper end of the air trap chamber 17 and held therein by suitable fastening member (not shown). An annular groove 28 is formed in the outer surface of the skirt 27. An O-ring seal 29 is mounted in the groove 28 and seals against the inner surface of the housing 10. An air escape passage 30 is provided in the upper portion of the valve housing 26 and is in communication with the air trap chamber 17. A valve 31 normally closes said air escape passage 30.

A toggle mechanism is located in the air trap chamber 17 and operatively connects the float 18 with the valve 31. The toggle mechanism consists of a lever 32 pivotally connected to the skirt 27 of the valve housing 26 at one of its ends in the manner indicated at 33. The other end of the lever 32 is provided with a laterally projecting pin 34 which rides in a horizontal slot 35 provided in a bracket 36 fastened to the float 18. A first toggle link 37 is pivotally attached at one of its ends to the arm 32 intermediate the ends thereof, as indicated at 38. The other end of the link 37 is pivotally attached at 39 to one end of a second toggle link 40. The other end of the link 40 is pivotally attached at 41 to the housing 26. A roller 42 is rotatably mounted on the link 40 intermediate the ends thereof and is confined between two thrust washers 43 and 44 fastened to the valve 31 in a manner to be described.

Referring now to Figs. 3 to 5, the air escape valve assembly 25 comprises the housing 26 having a transversely extending cylindrical recess 45 which connects at its left end with a vertical opening 46 in communication with the air trap chamber 17. The air escape passage 30 communicates with the recess 45. An inwardly facing flange 47 cooperates with and forms the valve seat for the poppet valve 31 which is mounted with its axis coincident with the axis of the recess 45. A cap member 48 is mounted on the valve 31 and has a depending flange 49 which holds an O-ring 50 in the semicircular groove 51 formed adjacent the rim of the valve 31. A valve stem 52 having an enlarged portion formed thereon is inserted through the thrust washer 44, cap 48 and valve 31 and is held therein by a nut 53, with the enlarged portion 52a abutting the washer 44 and the nut 53 abutting the right-hand end of the valve 31. An O-ring 74 prevents leakage between the stem 52 and the valve 31.

One end of the valve stem 52 extends beyond the right end of the valve 31, in the manner indicated at 54, and is slidably received in a central aperture of a guide plate 55 mounted in the recess 45 adjacent the mid-portion thereof. An aperture 56 is provided in the guide plate 55 to permit air to travel freely from one side of said plate to the other. A reduced diameter portion 57 of the valve stem 52 extends in the opposite direction from the enlarged portion 52a and is slidably received in a guide bushing 58 mounted in a cap 59 fastened in the left end of the recess 45. A nut 60 is threaded on said extended portion 57 and holds the thrust washer 43 against the enlarged portion 52a. The cap 59 is provided with an O-ring 61 which seals against the walls of the recess 45. A port 62 in the cap 59 connects the recess 45 with the space 63 behind the end of the valve stem extension 57.

The pressure acting on the left end of the valve 31 is balanced by a bellows assembly 64 comprising a sylphon bellows 65 fixed at one of its ends to an end member 66 and at its other end to an end member 67. A stud 68 is fastened at one of its ends to the end member 66. The other end thereof is threaded into a cap 69, which closes the right end of the recess 45. An O-ring 70 is mounted on the member 66 and seals against the walls of the recess 45, and similarly an O-ring 71 is mounted on the cap 69 and seals against the walls of the recess 45. A port 72 in the skirt 27 connects the air trap chamber 17 with the recess 45 between the end member 66 and the cap 69. A port 73 in the end member 66 connects the interior of the bellows 65 with the space between the end member 66 and the cap 69. Hence, the interior of the bellows 65 is at the same pressure as the air trap chamber 17.

In the operation of the device, when the pipe line into which the assembly is connected is not under pressure, the air escape valve mechanism 25 will assume the position illustrated in Fig. 3, with the bellows 65 contracted and the bellows end 67 out of contact with the valve stem extension 54. The assembly is initially adjusted by threading the stud 68 into or out of the cap 69. When the fluid line is put under pressure, the pressure from the air trap chamber 17 acts against the valve 31 and through the port 62 against the end of the valve stem extension 57, and tends to keep the valve closed. This tendency is overcome by the action of the sylphon bellows 65 which expands due to the pressure inside admitted from the air trap chamber 17 through the ports 72 and 73. When the bellows 65 expands, the end 67 thereof abuts the end of the valve stem extension 54 in the manner shown in Fig. 4. Since the pressure in air trap chamber 17 is applied to both ends of the valve and the area of the valve and the area of the bellows end 67 are equal, the valve is statically balanced for any pressure at which the assembly is to function.

Any air or gas which is entrained in the fluid entering the inlet port 11 will separate and rise into the air trap chamber 17. When the air liquid interface is lowered sufficiently, the float 18 will lower therewith and through the toggle mechanism open the valve 31 and permit the air or gas to escape through the passageway 30. As the air escapes, the liquid level rises and carries with it the float 18, causing the toggle linkage to close the valve 31 and prevent the escape of the liquid.

The air escape valve described herein is very sensitive and is operative over an infinite range of pressures since the valve at all times is statically balanced and does not have to overcome the line pressure in order to open.

While I have shown and described the preferred form of my invention, it is to be understood that changes may be made in its construction by those skilled in the art without departing from the spirit of the invention as defined in the appended claims.

Having thus described my invention, what I claim and desire to secure by Letters Patent is:

1. An air eliminating apparatus comprising a housing, an inlet to said housing, an outlet from said housing, an air trap chamber above both said inlet and said outlet, a passageway venting said air trap chamber, a poppet type valve normally closing said passageway, float means in said air trap chamber, means operatively connecting said float to said valve, and means for applying the pressure in said housing to both ends of said valve to statically balance said valve at all times when said valve is in its closed position.

2. An air eliminating apparatus comprising a housing, an inlet to said housing, an outlet from said housing, an air trap chamber above both said inlet and said outlet, a passageway venting said air trap chamber, a poppet type valve normally closing said passageway, said valve being mounted for reciprocal motion longitudinally of its axis, float means in said air trap chamber, means operatively connecting said float to said valve, and means for applying the pressure in said housing to both ends of said valve to statically balance said valve at all times when said valve is in the closed position.

3. An air eliminating apparatus comprising a housing, an inlet to said housing, an outlet from said housing, an air trap chamber above both said inlet and said outlet, a passageway venting said air trap chamber, a poppet type valve normally closing said passageway, said valve being mounted for reciprocal motion longitudinally of its axis, float means in said air trap chamber, a toggle linkage connecting said float to said valve, and means for applying the pressure in said housing to both ends of said valve to statically balance said valve at all times when said valve is in its closed position.

4. An air eliminating apparatus comprising a housing, an inlet to said housing, an outlet from said housing, an air trap chamber above both said inlet and said outlet, a passageway venting said air trap chamber, a valve in said passageway, a stem on said valve extending from the side thereof exposed to the atmosphere, float means in said air trap chamber, means operatively connecting said float to said valve, a sylphon bellows having one end fixed in said valve housing, the other end thereof adapted to contact the stem of said valve, means for applying the air trap chamber pressure to the inside of said bellows, and means for exposing the outside of said bellows to the pressure of the exhaust passageway.

5. An air eliminating apparatus comprising a housing, an inlet to said housing, an outlet from said housing, an air trap chamber above both said inlet and said outlet, a passageway venting said air trap chamber, a poppet type valve normally closing said passageway, a stem on said valve extending from the side thereof exposed to the atmosphere, float means in said air trap chamber, means operatively connecting said float to said valve, a sylphon bellows having one end fixed in said valve housing, the other end thereof adapted to contact the stem of said valve, means for applying the air trap chamber pressure to the inside of said bellows, and means for exposing the outside of said bellows to the pressure of the exhaust passageway.

6. An air eliminating apparatus comprising a housing, an inlet to said housing, an outlet from said housing, an air trap chamber above both said inlet and said outlet, a passageway venting said air trap chamber, a poppet type valve normally closing said passageway, said valve being mounted for reciprocal motion longitudinally of its axis, a stem on said valve extending from the side thereof exposed to the atmosphere, float means in said air trap chamber, means operatively connecting said float to said valve, a sylphon bellows having one end fixed in said valve housing, the other end thereof adapted to contact the stem of said valve, means for applying the air trap chamber pressure to the inside of said bellows, and means for exposing the outside of said bellows to the pressure of the exhaust passageway.

7. An air eliminating apparatus comprising a housing, an inlet to said housing, an outlet from said housing, an air trap chamber above both said inlet and said outlet, a passageway venting said air trap chamber, a poppet type valve normally closing said passageway, said valve being mounted for reciprocal motion longitudinally of its axis, a stem on said valve extending from the side thereof exposed to the atmosphere, float means in said air trap chamber, a toggle linkage connecting said float to said valve, a sylphon bellows having one end fixed in said valve housing, the other end thereof adapted to contact the stem of said valve, means for applying the air trap chamber pressure to the inside of said bellows, and means for exposing the outside of said bellows to the pressure of the exhaust passageway.

References Cited in the file of this patent

UNITED STATES PATENTS

| Number | Name | Date |
|---|---|---|
| 951,172 | Biedenmeister | Mar. 8, 1910 |
| 1,119,979 | Mulligan | Dec. 8, 1914 |
| 1,119,980 | Mulligan | Dec. 8, 1914 |
| 1,171,643 | Ray | Feb. 15, 1916 |
| 1,856,105 | Marden | May 13, 1932 |
| 1,887,918 | Brouse | Nov. 15, 1932 |
| 2,228,401 | Pressler | Jan. 14, 1941 |